(12) United States Patent
Bujewicz et al.

(10) Patent No.: US 11,506,291 B2
(45) Date of Patent: Nov. 22, 2022

(54) FILTER RETAINING PLUG AND TOOL (71) Applicant: Hamilton Sundstrand Corporation, Charlotte, NC (US)

(72) Inventors: Maciej Bujewicz, Wroclaw (PL); Marek Jedliński, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 22 days.

(21) Appl. No.: 16/691,839

(22) Filed: Nov. 22, 2019

(65) Prior Publication Data
US 2020/0166144 A1 May 28, 2020

(30) Foreign Application Priority Data
Nov. 27, 2018 (EP) .................................... 18461630

(51) Int. Cl.
- F16K 3/02 (2006.01)
- B01D 29/05 (2006.01)
- B23P 19/04 (2006.01)
- B25B 27/02 (2006.01)
- F15B 21/041 (2019.01)
- F15B 13/043 (2006.01)

(52) U.S. Cl.
CPC ............ *F16K 3/0209* (2013.01); *B01D 29/05* (2013.01); *B23P 19/04* (2013.01); *B25B 27/023* (2013.01); *F15B 13/043* (2013.01); *F15B 21/041* (2013.01)

(58) Field of Classification Search
CPC ..... B25B 27/023; F16K 3/0209; B01D 29/05; B23P 19/04; F15B 13/043; F15B 21/041; F16B 23/0084; F16B 23/0076; F16B 23/0069; F16B 23/0007; F16B 23/0061
See application file for complete search history.

(56) References Cited

U.S. PATENT DOCUMENTS

| | | | | |
|---|---|---|---|---|
| 168,357 | A | * 10/1875 | Uster | ................... F16B 23/0061 411/405 |
| 2,372,269 | A | * 3/1945 | Golan | ................. F16B 23/0061 81/121.1 |
| 2,568,998 | A | 9/1951 | Fletcher | |
| 3,052,973 | A | 9/1962 | Williams | |
| 3,174,383 | A | * 3/1965 | Heil | ........................ F16B 23/00 411/405 |

(Continued)

FOREIGN PATENT DOCUMENTS

CN 203979641 U 12/2014

OTHER PUBLICATIONS

Extended European Search Report for International Application No. 18461630.8 dated Jun. 18, 2019, 8 pages.

*Primary Examiner* — Daphne M Barry
(74) *Attorney, Agent, or Firm* — Cantor Colburn LLP (57) ABSTRACT A plug for retaining a filter screen in a fluid port of a servovalve, the plug comprises an annular body. The annular body comprises opposed first and second axial annular end surfaces. A radially inner surface extends between the first and second axial annular end surfaces and a radially outer surface extends between the first and second axial annular end surfaces. At least one recess is formed in the radially inner surface for receiving a tool for removing the plug from the port. A plurality of slots is formed in the first axial annular end surface and extends into the at least one recess for providing access for the tool to the at least one recess.

8 Claims, 12 Drawing Sheets

(56) References Cited

U.S. PATENT DOCUMENTS

| | | | | |
|---|---|---|---|---|
| 3,912,116 A | * | 10/1975 | Chahley | F16B 23/0061 |
| | | | | 220/288 |
| 4,435,112 A | | 3/1984 | Becker | |
| 4,724,608 A | | 2/1988 | Parrott | |
| 5,012,566 A | | 5/1991 | Getz, Jr. | |
| 5,379,330 A | | 1/1995 | Lovell | |
| 6,021,996 A | | 2/2000 | Nakayoshi | |
| 7,141,165 B2 | * | 11/2006 | Cheong | B01D 35/02 |
| | | | | 210/232 |
| 2010/0192344 A1 | * | 8/2010 | Zollmann | F16B 23/0007 |
| | | | | 29/256 |
| 2015/0089787 A1 | * | 4/2015 | Schon | B25B 23/0007 |
| | | | | 29/426.5 |
| 2018/0313178 A1 | * | 11/2018 | Biggerstaff | E21B 21/106 |

\* cited by examiner

FILTER RETAINING PLUG AND TOOL

FOREIGN PRIORITY

This application claims priority to European Patent Application No. 18461630.8 filed Nov. 27, 2018, the entire contents of which is incorporated herein by reference.

TECHNICAL FIELD

The present disclosure relates to plugs which are used to retain a filter in, for example, a servovalve and to tools which may be used in removing such plugs.

BACKGROUND

Servovalves are used in a wide variety of aircraft control systems, for example in fuel and air management systems for operating engine fuel metering valves, active clearance control valves, bleed valves and so on. The operating medium of the servovalve will potentially be contaminated. Accordingly, servovalves are provided with filters. Such filters may include filter screens which are assembled in ports of the servovalve, for example in supply, control or return ports of the valve. These screens act to retain any particles which are large enough potentially to cause potential failure of the valve. For example in a flapper type servovalve, comprising two nozzles and a movable flapper element arranged between them, the total flapper operating total distance may be as small as about 0.2 mm. In such valves, the filter screen will typically act to filter out particles having a nominal size larger than 0.07 mm. Such filter screens can easily become blocked. This necessitates cleaning or removal and replacement of the filter screens. However, this may be difficult as the filter screen is typically retained by a press fitted plug. Removal of this plug is difficult and may cause damage to the servovalve body, requiring the servovalve itself then to require repair.

SUMMARY

From a first aspect, the disclosure provides a plug for retaining a filter screen in a fluid port of a servovalve, the plug comprising an annular body, the annular body comprising opposed first and second axial annular end surfaces. A radially inner surface extends between the first and second axial annular end surfaces and a radially outer surface extends between the first and second axial annular end surfaces. At least one recess is formed in the radially inner surface for receiving a tool for removing the plug from the port. A plurality of slots is formed in the first axial annular end surface and extends into the at least one recess for providing access for the tool to the at least one recess.

The slots may be are evenly annularly distributed around the first axial annular end surface.

The plurality of slots may comprise two diametrically opposed slots.

Each slot may have a radial width between 40% to 100% of the radial width of the first axial annular end surface.

Each slot may have a length between 30% and 40% of the outer diameter of the plug body measured between opposing points on the radially outer surface.

Each slot may comprise two side surfaces with chamfered or rounded top edges and/or chamfered or rounded bottom edges.

The disclosure also provides a servovalve comprising a port for receiving an working fluid, a filter screen mounted in the port and a plug in accordance with the disclosure interference fitted in the port to retain the filter screen in the port.

This disclosure also provides a tool for removing a plug in accordance with the disclosure from a port, the tool comprising a rod having an upper portion, a lower portion comprising a plurality of outwardly projecting teeth for engaging in the recess of the plug annular body and locking the lower portion in the plug annular body, and an externally threaded portion between the lower portion and the upper portion. A nut is engageable with the externally threaded portion and rotatable to remove the rod and plug from the port. A sleeve is configured to be positioned on the rod between the nut and the plug.

The tool may further comprise a key formation for engagement with a key member to rotate the rod.

The teeth may comprise chamfered or rounded edges.

The height of the teeth may be between 80% and 90% of the height of the recess.

The lower portion of the rod may have a portion with smaller diameter than the externally threaded portion. The lower portion of the rod may optionally have a tapered neck between the portion and the externally threaded portion.

This disclosure also provides a method of removing a filter screen retaining plug from a fluid port of a servovalve, the method comprising inserting an end of a removal tool into the plug, rotating the removal tool to lock the end of the removal tool inside the plug, and applying a force to the removal tool in a direction away from the fluid port and parallel to the longitudinal axis of the fluid port to disengage the plug from the fluid port.

The force may be applied by rotating a nut threaded onto a rod of the removal tool.

This disclosure also provides a method of maintaining a servovalve comprising a fluid port and a filter screen retained in the fluid port by a plug in accordance with the disclosure interference fitted within the fluid port, comprising engaging a removal tool with the at least one recess of the plug body and pulling the plug out of the port using the tool. The removal tool is optionally a tool in accordance with the disclosure.

DETAILED DESCRIPTION

Figure 1:
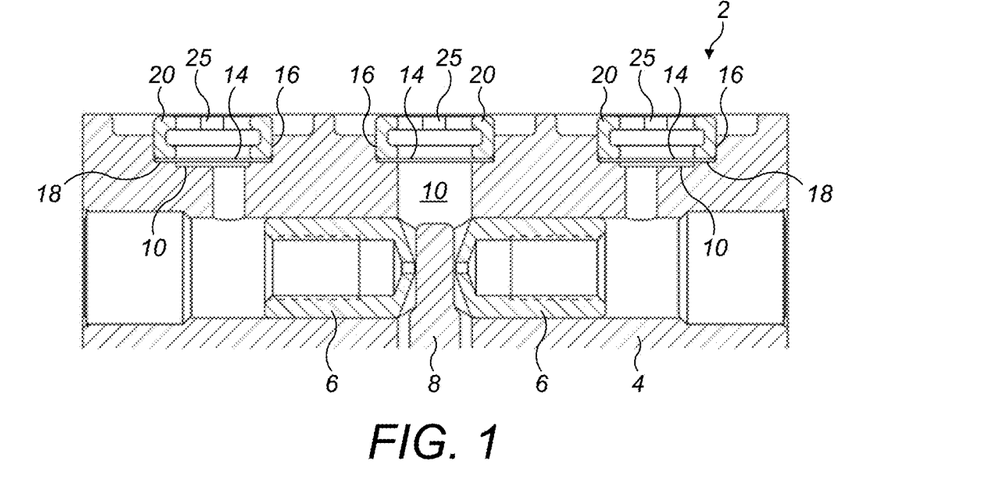
FIG. 1 shows a cross-section through a servovalve in accordance with the disclosure.
Figure 2:
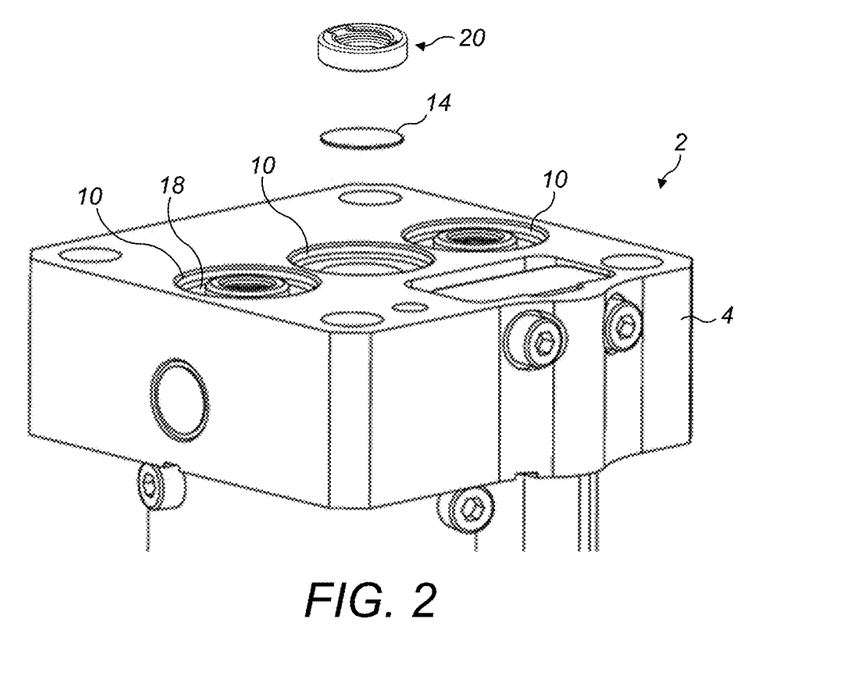
FIG. 2 shows an exploded view of the servovalve of FIG. 1.

With reference to FIGS. 1 and 2, a servovalve 2 comprises a servovalve housing 4 which houses a pair of nozzles 6 and a flapper element 8. As is known in the art, the flapper element 8 is deflected in a direction along the axes of the nozzles 6 by an actuator, not shown, in order to meter a working fluid which passes through the nozzles 6.

The servovalve housing 4 comprises three ports 10, which allow communication of the working fluid to the nozzles 6. The central port 10 is typically called a control port and its function is to communicate fluid to an actuator (not shown). This type of servovalve is well known in the art, being used in a wide variety of aircraft control systems, for example in fuel and air management systems for operating engine fuel metering valves, active clearance control valves, bleed valves and so on.

Since, as is discussed above, the distances moved by the flapper element 8 may be relatively small, in order to prevent operation of the flapper element 8 being compromised by contamination, particle filters 14 are arranged in one or more of the ports 10. As can be seen in FIG. 1, in an embodiment of the disclosure, the filters 14 are received within a bore 16 of the respective ports 10 and are received on an annular shoulder 18 at the base of each bore 16.

The filter 14 may be a screen or mesh structure as is known in the art, with an appropriate mesh size. For example, in some embodiments the filter 14 may be configured to filter particles having a nominal size larger than 0.07 mm. The filter 14 may be made from any suitable material, for example a metal or a plastics material.

The filter 14 is retained on the shoulder 18 within the bore 16 by a plug 20 which is press fitted into the bore 16. With reference to FIGS. 3 to 10, the plug 20 has an annular body 22 having opposed first and second axial annular end surfaces 24, 26, a radially inner surface 28 extending between the first and second axial annular end surfaces 24, 26 and a radially outer surface 30 extending between the first and second axial annular end surfaces 24, 26. The first and second axial annular end surfaces 24, 26 are generally parallel to one another and perpendicular to the central axis A of the plug 20. The radially inner and outer surfaces 28, 30 are also generally parallel to one another and extend parallel to the central axis A of the plug 20.

An annular recess 36 is formed in the radially inner surface 28. In this embodiment, the recess 36 extends entirely around the circumference of the inner surface 28. In other embodiments, however, one or more pairs of diametrically opposed recesses may be provided instead. However, an annular recess 36 may be more easily manufactured and may facilitate removal of the plug 20.

The recess 36 extends into the plug body 22 generally perpendicularly to the radially inner surface 28. In the disclosed embodiment, the recess 36 has opposed axial surfaces 38, 40 and a base surface 42. The axial surfaces 38, 40 may, as shown, be parallel to the axial end surfaces 24, 26 of the plug body 22. The base surface 42 may be parallel to the radially inner and outer surfaces 28, 30 of the plug body 22.

The recess 36 may extend radially into the plug body 22 from the radially inner surface 28 to a depth D of from 30-50% of the thickness T of the plug body 22 measured between the radially inner and radially outer surfaces 28, 30 of the plug body 22.

The recess 36 may have a height $H_R$ measured in the direction between its opposed axial surfaces 38, 40 of from 0.25 to 0.43 of the height $H_P$ of the plug body 22 measured between the first and second axial annular end surfaces 24, 26 of the plug body 22.

In this embodiment, the radially inner surface 28 has an inner diameter $D_{PI}$ which is the same on both sides of the recess 36. In other embodiments, the inner diameter $D_{PI}$ may be larger above the recess 36 (adjacent the first axial annular end surface 24) than below the recess 36 (adjacent the second axial annular end surface 26). In further embodiments, the inner diameter $D_{PI}$ may be smaller above the recess 36 than below the recess 36.

In a typical embodiment, the plug body 22 may have an outer diameter $D_{PO}$ of 7.5 mm and an inner diameter $D_{PI}$ of 4.7 mm and the recess 36 may have an outer diameter $D_R$ of 6 mm. The inner diameter $D_{PI}$ of the plug body 22 will need to be large enough to allow the flow of working fluid through the respective ports 10. The height $H_P$ of the plug body 22 may typically be 2.7 mm and the height $H_R$ of the recess 36 may typically be 1 mm.

A pair of diametrically opposed slots 25 are formed in the first axial annular end surface 24. The slots 25 provide access for the teeth 64 of a plug removal tool to enter the recess 36 within the plug body 22, as will be discussed further below.

Each slot 25 extends radially from the radially inner surface 28, between the axial surface 38 of the recess 36 and the first axial annular end surface 24, towards the radially outer surface 30. Each slot 25 has a radial width $W_S$ between 40% and 100%, for example between 40% and 90%, of the radial width $W_R$ of the first axial annular end surface 24 measured between the radially inner surface 28 and the radially outer surface 30. The slots 25 extend axially from the first axial annular end surface 24 to the top of the recess 36, thus providing an increased inner diameter $D_S$ in the dimension perpendicular to the inner diameter $D_{PI}$ shown in FIG. 7.

Figure 3:
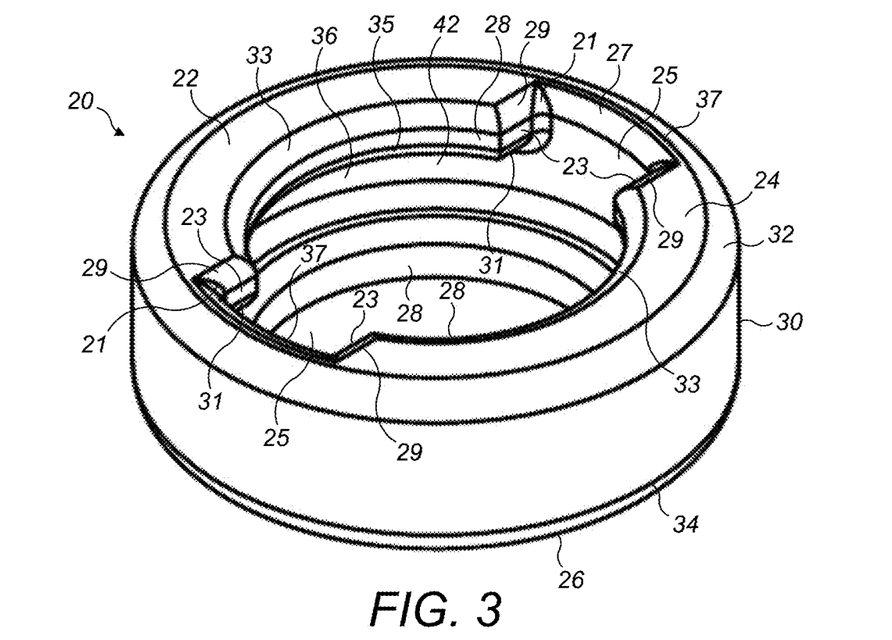
FIG. 3 shows a perspective view of a plug in accordance with the disclosure.
Figure 4:
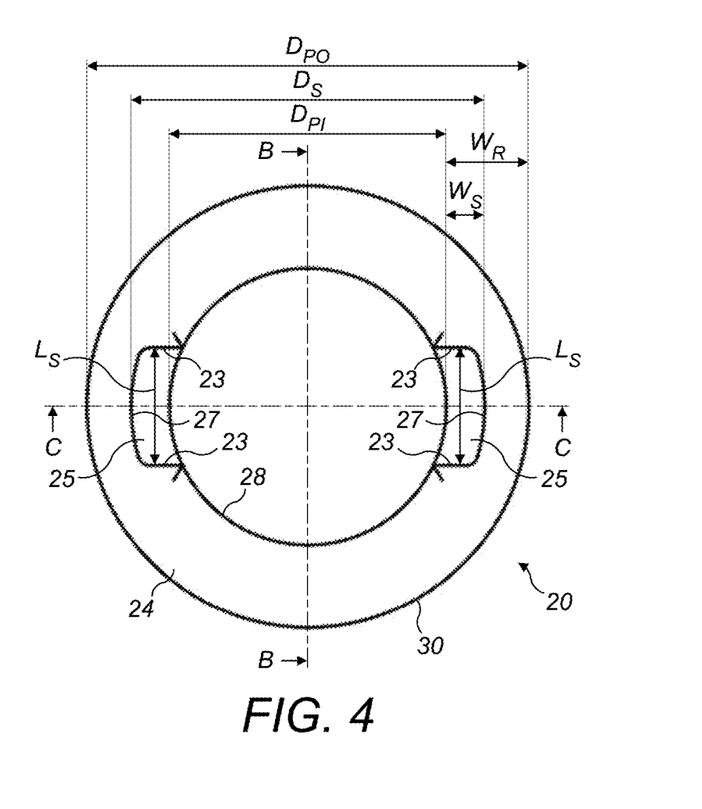
FIG. 4 shows a plan view of the plug of FIG. 3.
Figure 5:
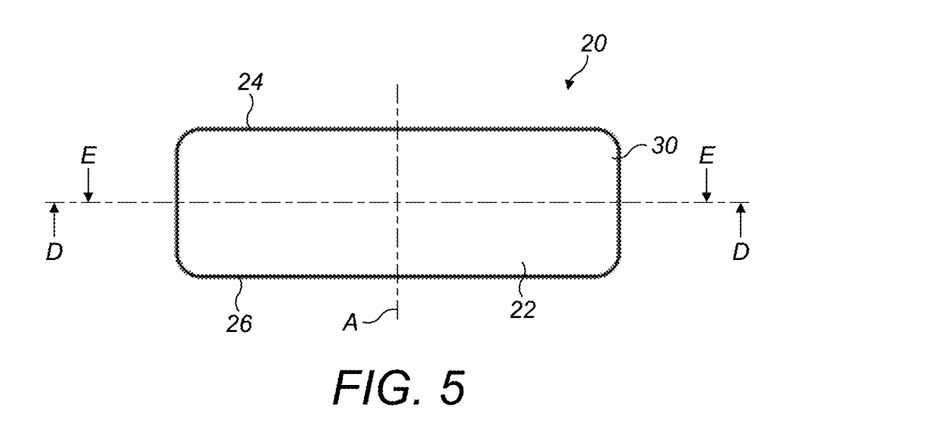
FIG. 5 shows a side view of the plug of FIG. 3.
Figure 6:
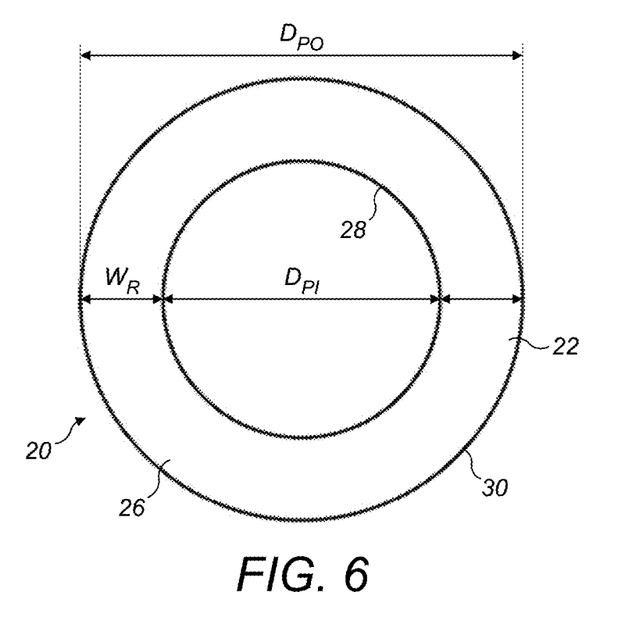
FIG. 6 shows a bottom view of the plug of FIG. 3.

Each slot 25 has parallel side surfaces 23 which correspond to the profile of the teeth 64 of the tool 50, as discussed below. The side surfaces 23 define a length $L_S$ of the slot 25. A typical length $L_S$ for a slot 25 is between 30% and 40% of the outer diameter $D_{PO}$ of the plug body 22 measured between opposing points on the radially outer surface 30. Each slot 25 has a radially outer slot surface 27 that follows the curve of the first axial annular end surface 24 and is parallel to the radially outer surface 30 of the plug body 22. As can be seen in FIG. 3, fillets 21 may be present where the side surfaces 23 join the radially outer surface 27 of each slot 25.

Figure 7:
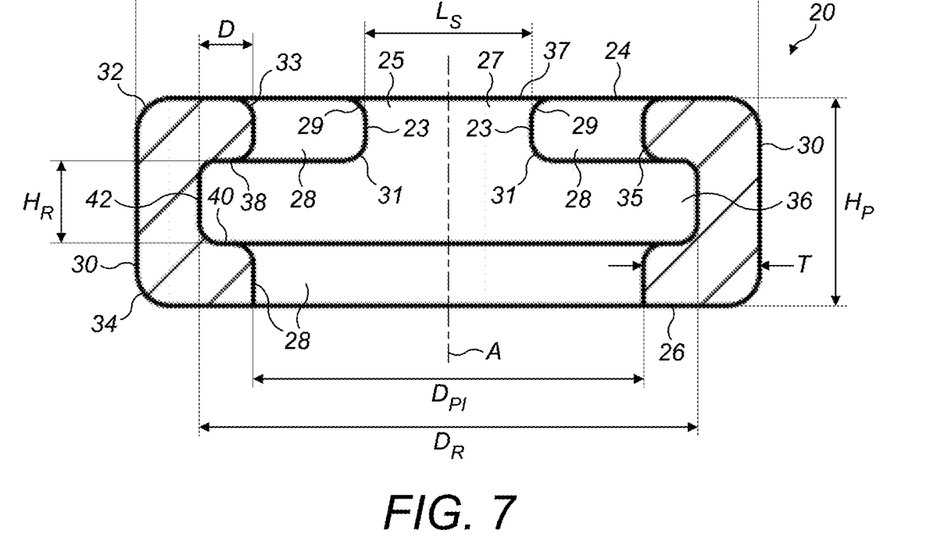
FIG. 7 shows a cross-sectional view of the plug of FIG. 4 along the line B-B of FIG. 4.
Figure 8:
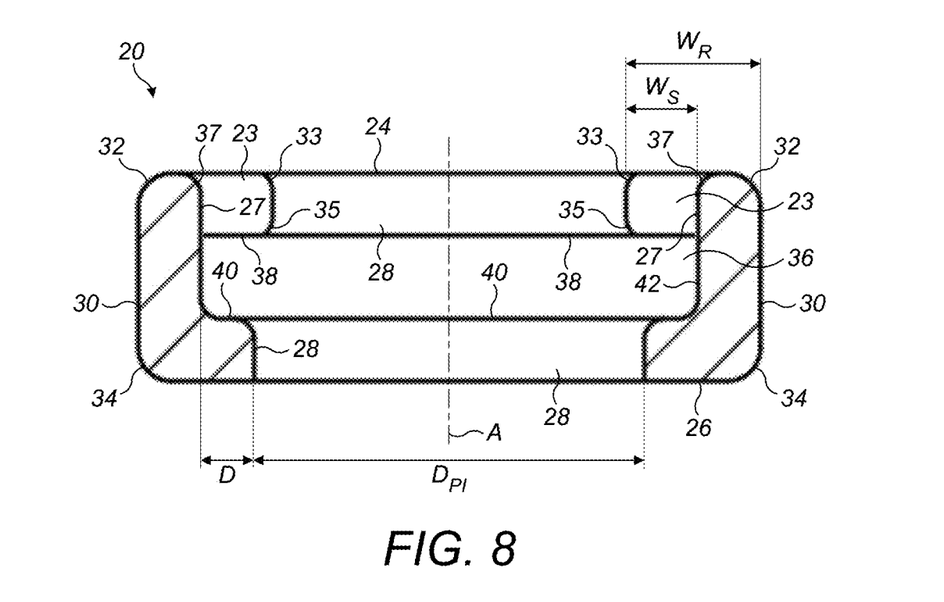
FIG. 8 shows a cross-sectional view of the plug of FIG. 4 along the line C-C of FIG. 4.
Figure 9:
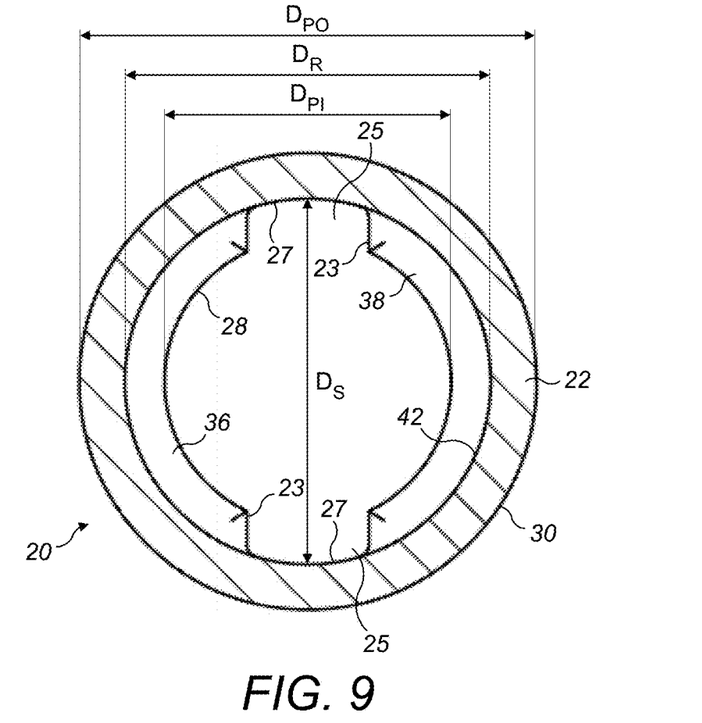
FIG. 9 shows a cross-sectional view of the plug of FIG. 5 along the line D-D of FIG. 5.
Figure 10:
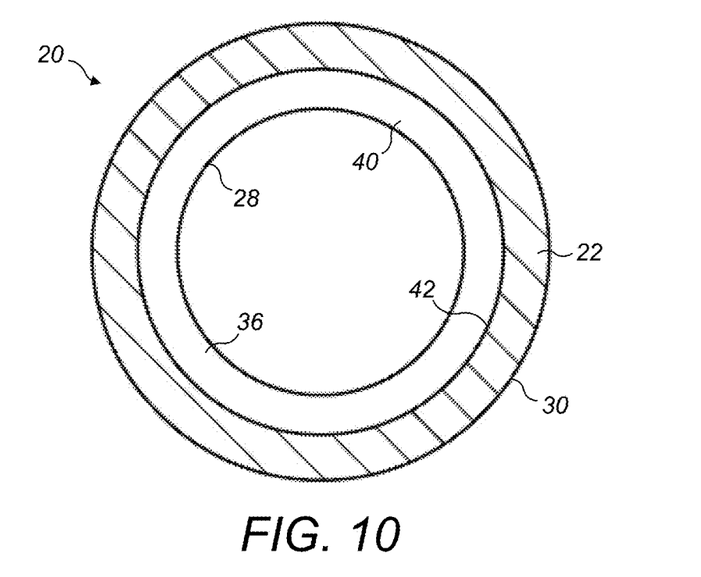
FIG. 10 shows a cross-sectional view of the plug of FIG. 6 along the line E-E of FIG. 5.

The top and bottom edges 29, 31 of the side surfaces 23 of the slots 25 and the top edge 37 of the radially outer slot surface 27 are rounded or chamfered as shown in FIGS. 3, 7 and 8. The edges 33 where the radially inner surface 28 meets the first axial annular end surface 24 and the edges 35 where the radially inner surface 28 meets the axial surface 38 of the recess 36 are also rounded or chamfered, as shown in FIGS. 3, 7 and 8. The rounded or chamfered edges 29, 31, 33, 35, 37 facilitate the insertion of the tool 50 into the recess 36 and the removal of the tool 50 from the recess 36. The lack of sharp edges reduces the chances of loose material being scraped off or otherwise removed from the plug body 22 or tool 50 and causing damage by falling into the fluid port 10.

In this embodiment, the plug 20 has two diametrically opposed slots 25 formed in the first axial annular end surface 24. However, in other embodiments, the plug 20 may have more than two slots 25, for example three or four slots 25. It is also feasible that the plug 20 could have just one slot 25, for example if the material of the plug body 22 is rigid enough to maintain its horizontal orientation when being removed by the application of an upward force on only one side of the plug body 22. The slots 25 can be evenly distributed around the first axial annular end surface 24.

As can be seen in FIGS. 3, 7 and 8, the corners 32, 34 between the first and second axial end surfaces 24, 26 and the radially outer surface 30 may be chamfered or rounded in order to facilitate insertion of the plug 20 into the bore 16.

The plug body 22 may be made from any suitable material. In certain embodiments, the plug body 22 may be made from aluminium for example. This will provide sufficient rigidity and strength for the plug body 22.

As discussed above, the plug body 22 is press fitted into the bore 16 in order to retain the filter 14 in position. The slots 25 and recess 36 facilitate removal of the plug 20 from the bore 16 as will be discussed further below.

FIGS. 11 to 20 illustrate a tool 50 which may be used in removing the plug 20 from a bore 16.

Figure 11:
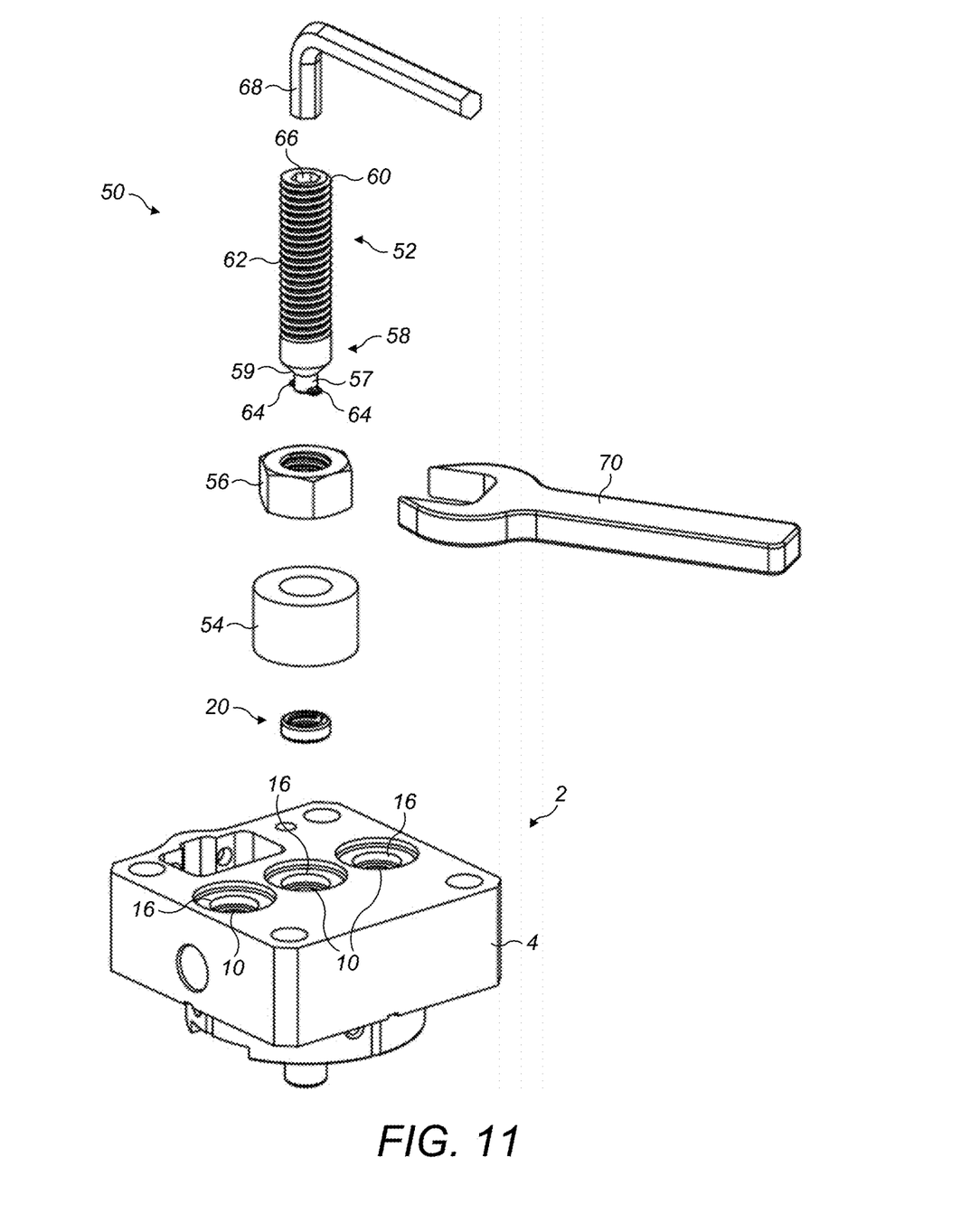
FIG. 11 shows an exploded view of a servovalve, plug and plug removal tool in accordance with the disclosure.
Figure 12:
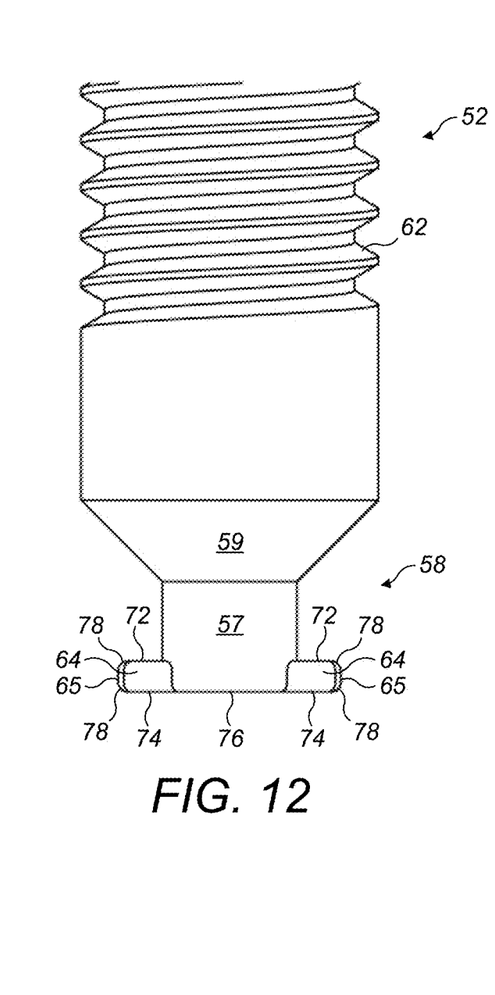
FIG. 12 shows a side view of the plug removal tool in accordance with the disclosure.
Figure 13:
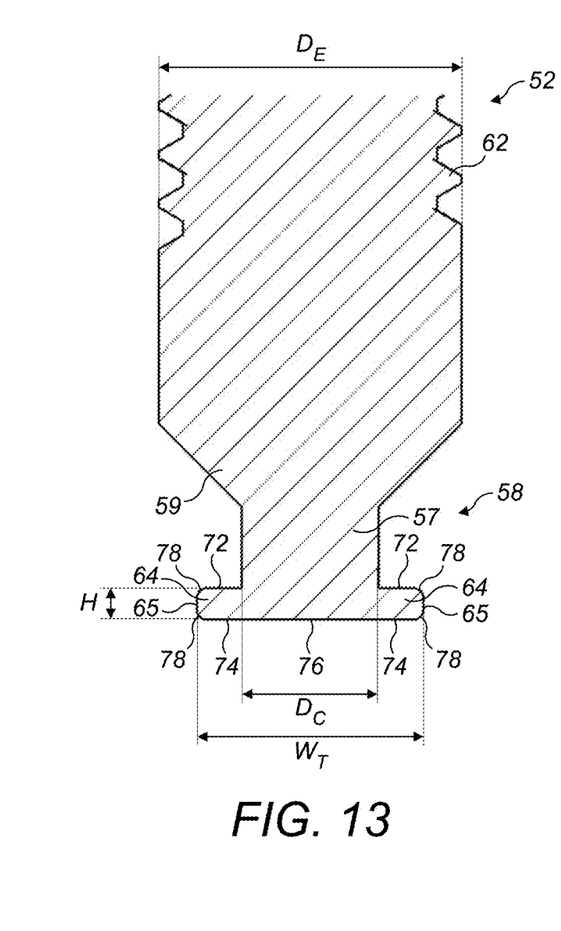
FIG. 13 shows a cross-sectional view of the plug removal tool of FIG. 12.

The tool 50 comprises a rod 52, sleeve 54 and nut 56. The rod 52 has a lower portion 58, an upper portion 60, and an externally threaded portion 62. The upper portion 60 may also be externally threaded and the externally threaded portion 62 may have one or more parts without an external thread. The lower portion 58 is sized and shaped to be received within the annular body 22 of the plug 20. The lower portion 58 has a pair of diametrically opposed outwardly projecting teeth 64 which are sized and shaped to be received within the slots 25 of the first axial annular end surface 24 of the plug body 22. Due to the cooperation between the slots 25 and the teeth 64, the end of the lower portion 58, including the teeth 64, can be received by the recess 36 in the plug body 22.

The width $W_T$ of the rod 52 between the radially outer surfaces 65 of the teeth 64 is larger than the inner diameter $D_{PI}$ of the plug body 22, therefore the axial surface 40 which forms the base of the recess 36 prevents the rod 52 from passing any lower through the plug body 22 as it has no slots for the teeth 64 to pass through.

The slots 25 and teeth 64 are configured such that the rod 52 can only be inserted into and removed from the plug body 22 in two configurations, when first and second teeth 64 are respectively aligned with the first and second slots 25. Therefore the width $W_T$ of the rod 52 between the radially outer surfaces 65 of the teeth 64 is less than or equal to the increased inner diameter $D_S$ of the plug body 22 to allow the lower portion 58 of the rod 52 to be at least partly inserted into the plug body 22 when the rod 52 is in an insertion position and then rotated into a locked position with the teeth 64 and the slots 25 out of alignment. The width $W_T$ of the rod 52 at the teeth 64 is therefore greater than the inner diameter $D_{PI}$ of the plug body 22 to provide the locking capability.

The teeth 64 may have any suitable profile as long as they can pass through the slots 25 and be received within the recess 36. In this embodiment, the upper and lower surfaces 72, 74 of each tooth 64 are flat. This may facilitate the application of force from the teeth 64 to the plug body 22 as the plug 20 is being removed by maximising the surface area of the teeth 64 that is in contact with the axial surface 28 of the plug body 22 when the plug 20 is being removed.

In embodiments, the relative dimensions of the teeth 64 and the recess 36, such as the height $H_T$ of the teeth 64 and the height $H_R$ of the recess 36, may be such that the recess 36 provides a loose fit for the teeth 64. For a loose fit, the height $H_T$ of the teeth 64 is less than the height $H_R$ of the recess 36, for example $H_T$ is approximately 80% to 90% of $H_R$. The diameter $D_R$ of the recess 36 is very slightly larger than the width $W_T$ of the tool 50 across the teeth 64 to enable the tool 50 to rotate. The tool 50 can therefore be rotated easily with minimal contact and/or friction between the upper and lower surfaces 72, 74 of the teeth 64 and the axial surfaces 38, 40 of the recess 36.

The rod 52 has a key formation 66 in its upper portion 60 which is sized and shaped to engage with a corresponding key member 68 which can be used to rotate the rod 52 about the longitudinal axis of the rod 52. In this embodiment, the key formation 66 is a hexagonal socket and the key member 68 is an Allen key 68. In other embodiments, the upper portion 60 of the rod 52 has an external key formation that can be received by a key member with an internal key formation to rotate the rod 52.

The rod 52 can also be rotated directly by hand, for example by gripping the upper portion 60 of the rod 52, without requiring a key member 68 such as an Allen key 68. However, using a tool such as an Allen key 68 provides easier gripping of the rod 52 and allows the rod 52 to be turned more easily.

The lower surfaces 74 of each tooth 64 are flush with the flat lower surface 76 of the lower portion 58 of the rod 52, as can be seen from FIGS. 12 and 13. This avoids damage to the filter screen 14 by the tool 50 since the lowermost part of the tool 50, the lower surface 76, can only extend as far down as the teeth 64 can, which is to the bottom of the recess 36.

The teeth 64 have chamfered or rounded edges 78, as can be seen from FIGS. 12 and 13, which may facilitate the insertion of the teeth 64 through the slots 25 and into the recess 36 and the rotation of the teeth 64 in the recess 36. The lack of sharp edges also reduces the chances of loose material being scraped off or otherwise removed from the plug body 22 or tool 50 and causing damage by falling into the fluid port 10. Of course other shapes of teeth 64 are possible within the scope of the disclosure. In this embodiment, the teeth 64 are the same size and shape, however in other embodiments the teeth 64 may differ from each other.

The sleeve 54 acts as a spacer to separate the nut 56 from the plug 20 and the upper surface of the servovalve housing 4 around the fluid port 10. The prevention of contact between the nut 56 and the servovalve housing 4 is important to protect the servovalve housing 4 from damage due to friction resulting from the movement of the nut 56. The sleeve 54 also facilitates the rotation of the nut 56. The externally threaded portion 62 of the rod 52 enables the internally threaded nut 56 to be threaded onto the rod 52 and into abutment with the sleeve 54. The nut 56 may be turned and tightened with a spanner 70, as shown in FIGS. 11, 14, 15 and 16.

The lower portion 58 of the rod 52 comprises a cylindrical portion 57 with a diameter $D_C$ smaller than the diameter $D_E$ of the externally threaded portion 62 and a neck portion 59 which tapers from the larger diameter $D_E$ of the externally threaded portion 62 to the smaller diameter $D_C$ of the cylindrical portion 57. The teeth 64 protrude from the base of the cylindrical portion 57.

The diameter $D_C$ of the cylindrical portion 57 (not including the teeth 64) being smaller than the diameter $D_E$ of the externally threaded portion 62 allows the lower portion 58 to be small enough to fit within the plug body 22 while the externally threaded portion 62 is thick enough to provide sufficient strength to the rod 52 so that the rod 52 does not break or bend when the nut 56 is turned by the spanner 70.

Having described the plug 20 and tool 50, removal of a plug 20 from a bore 16 will now be described. FIGS. 17 to 20 illustrate the insertion and locked positions of the rod 52.

Figure 17:
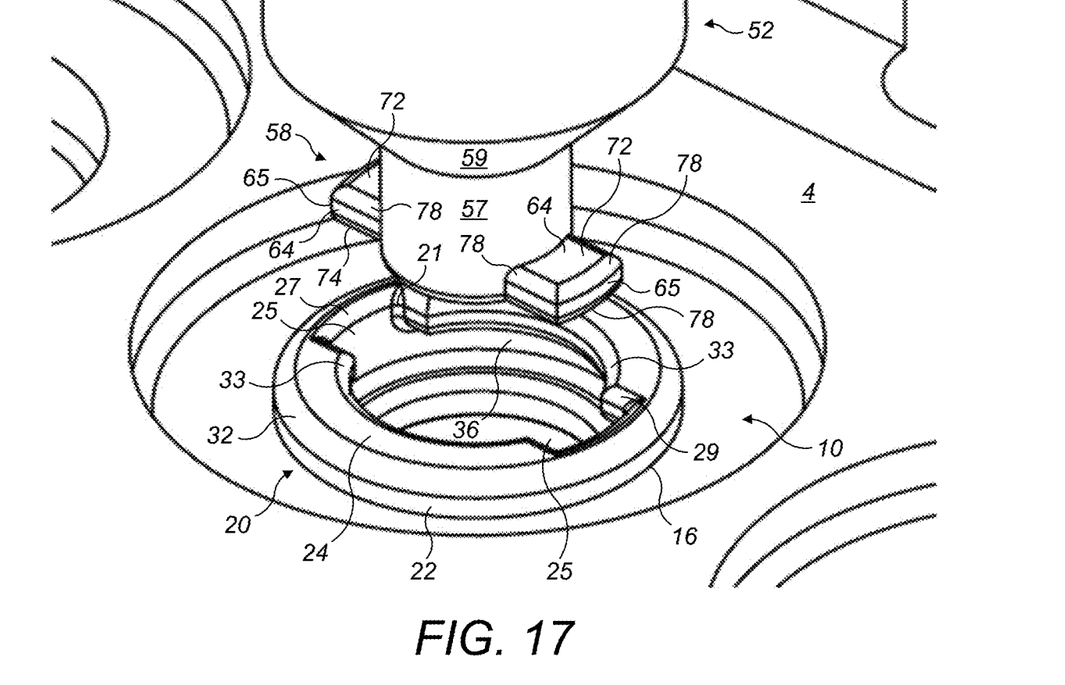
FIG. 17 shows a close-up perspective view of the servovalve, plug and plug removal tool prior to engagement of the tool with the plug, with the tool in an insertion position.

Firstly, with the rod 52 in the insertion position shown in FIG. 17, the lower portion 58 of the rod 52 is inserted into the plug 20. As can be clearly seen from FIG. 17, in the insertion position the teeth 64 of the lower portion 58 must be aligned with the slots 25 of the plug 20 in order for the lower portion 58 to be inserted into the plug 20. The rod 52 is inserted to such a depth that the teeth 64 are located within the recess 36.

Figure 18:
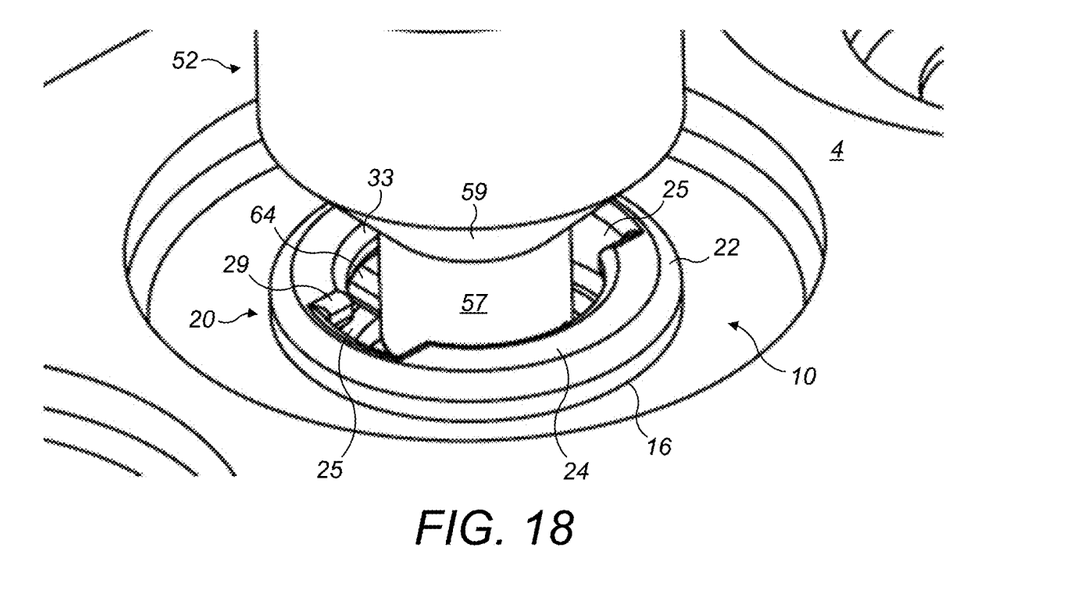
FIG. 18 shows a close-up perspective view of the servovalve, plug and plug removal tool in a removal configuration with the tool engaged with the plug and in a locked position.
Figure 19:
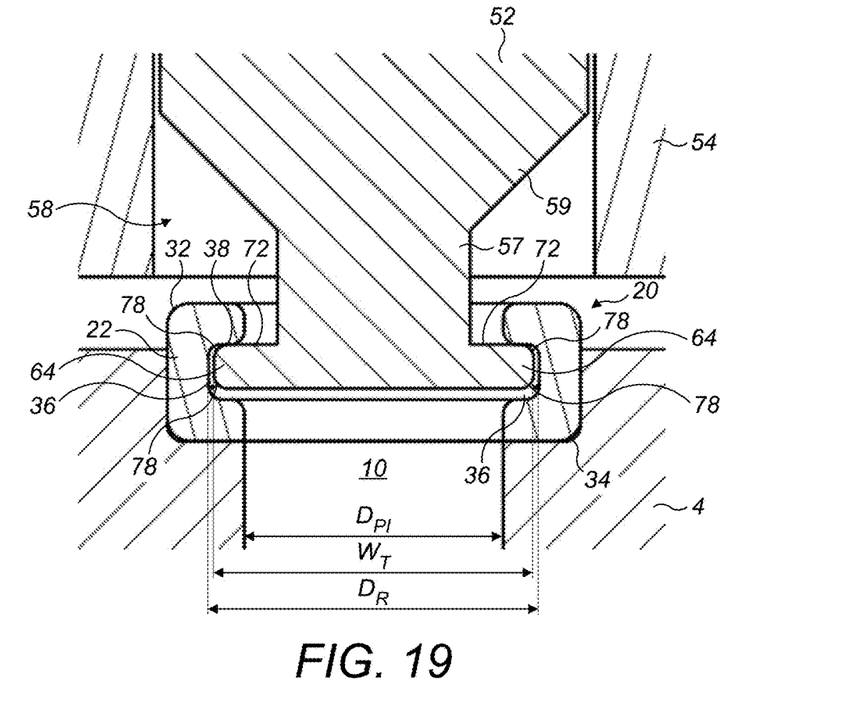
FIG. 19 shows a cross-sectional view of the servovalve, plug and plug removal tool of FIG. 18, corresponding to the cross-sectional views of the plug of FIG. 7 and the tool of FIG. 13.
Figure 20:
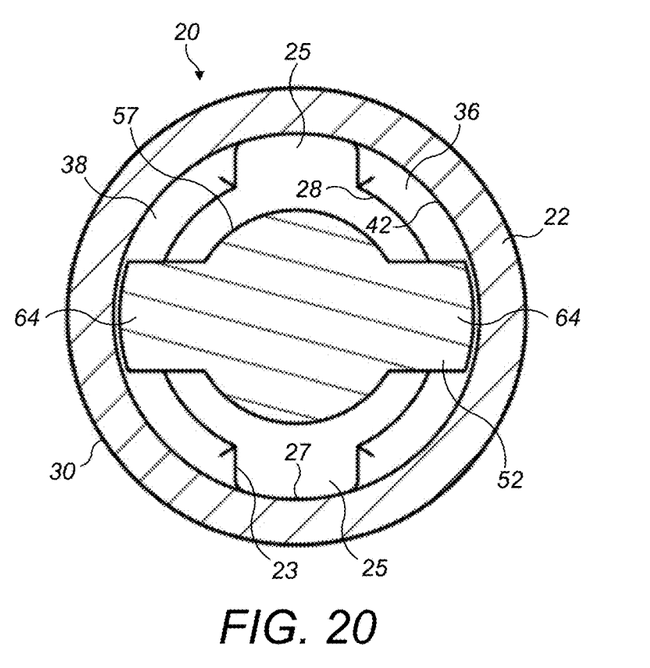
FIG. 20 shows another cross-sectional view of the plug and plug removal tool of FIG. 18, corresponding to the cross-sectional view of the plug of FIG. 9.

The rod 52 is then rotated to the locked position in which the teeth 64 are no longer aligned with the slots 25 of the plug 20, as shown in FIGS. 18 to 20. The rod 52 can be rotated by inserting the Allen key 68 into the socket 66 in the upper portion 60 of the rod 52 and turning the Allen key 68. Once the rod 52 is in the locked position, the Allen key 68 can be removed. In other embodiments, the rod 52 can be rotated into the locked position directly by a user's hand.

In the locked position, the teeth 64 can be in any rotational position within the recess 36 of the plug 20 that prevents the removal of the rod 52 from the plug 20. Some rotational positions may be more optimal than others for the application of force from the teeth 62 to the plug body 22 when the plug body 22 is being removed from the bore 16. For example, in this embodiment with two teeth 64 and two slots 25, the rod 52 is rotated by approximately 90° to provide the optimal distribution of force applied by the teeth 64 to the plug body 22 to easily remove the plug 20.

The optimal amount of rotation of the rod 52 into the locked position depends on the number and distribution of teeth 64 and slots 25. For example, in an embodiment with three teeth 64 evenly distributed around the lower portion 58 of the rod and three slots 25 evenly distributed around the first axial annular end surface 24 of the plug body 22, an optimal amount of rotation of the rod 52 would be 60°.

Once the rod 52 is in the locked position, the sleeve 54 is slid onto the rod 52 and into abutment with the servovalve housing 4 surrounding the plug 20. The nut 56 is then threaded onto the rod 52 along the externally threaded portion 62 and tightened against the sleeve 54 using a spanner 70.

Figure 14:
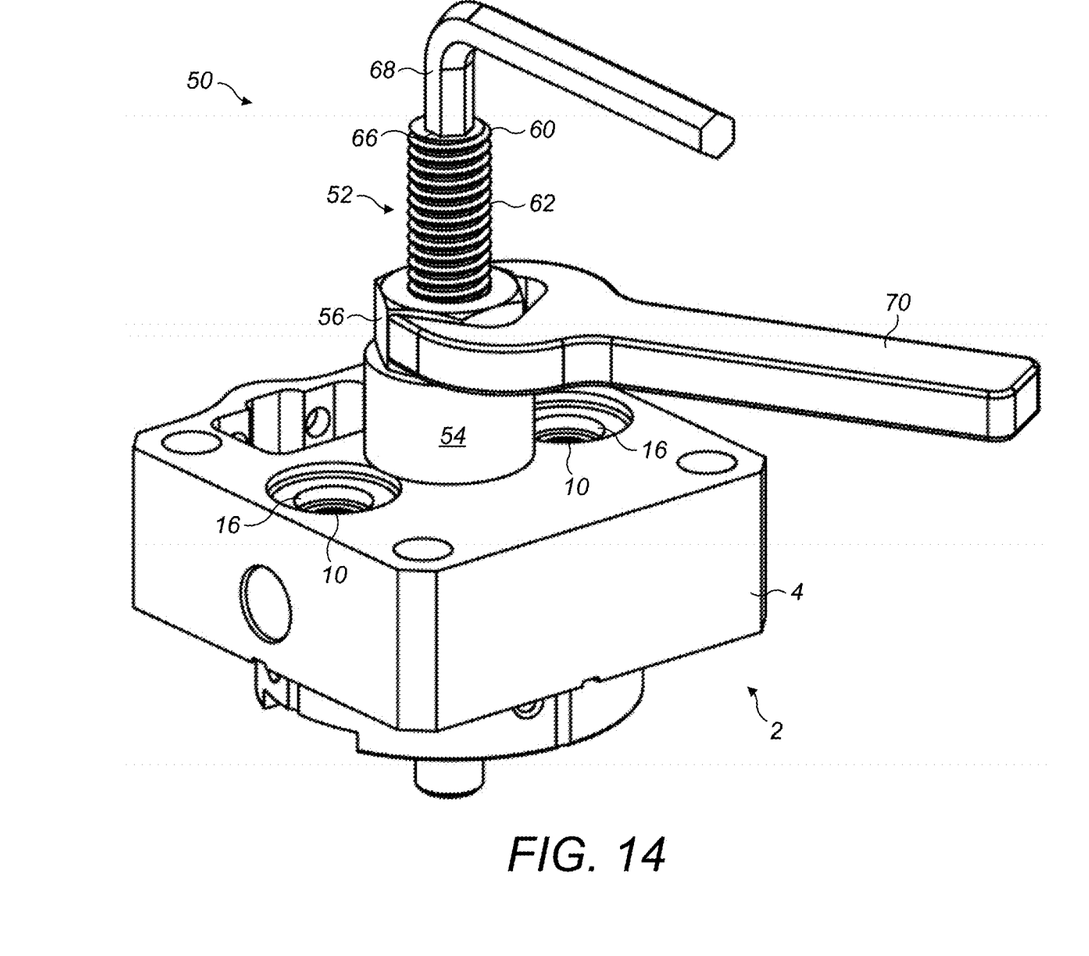
FIG. 14 shows a perspective view of the servovalve and plug removal tool of FIG. 11 in a removal configuration engaged with the plug.
Figure 15:
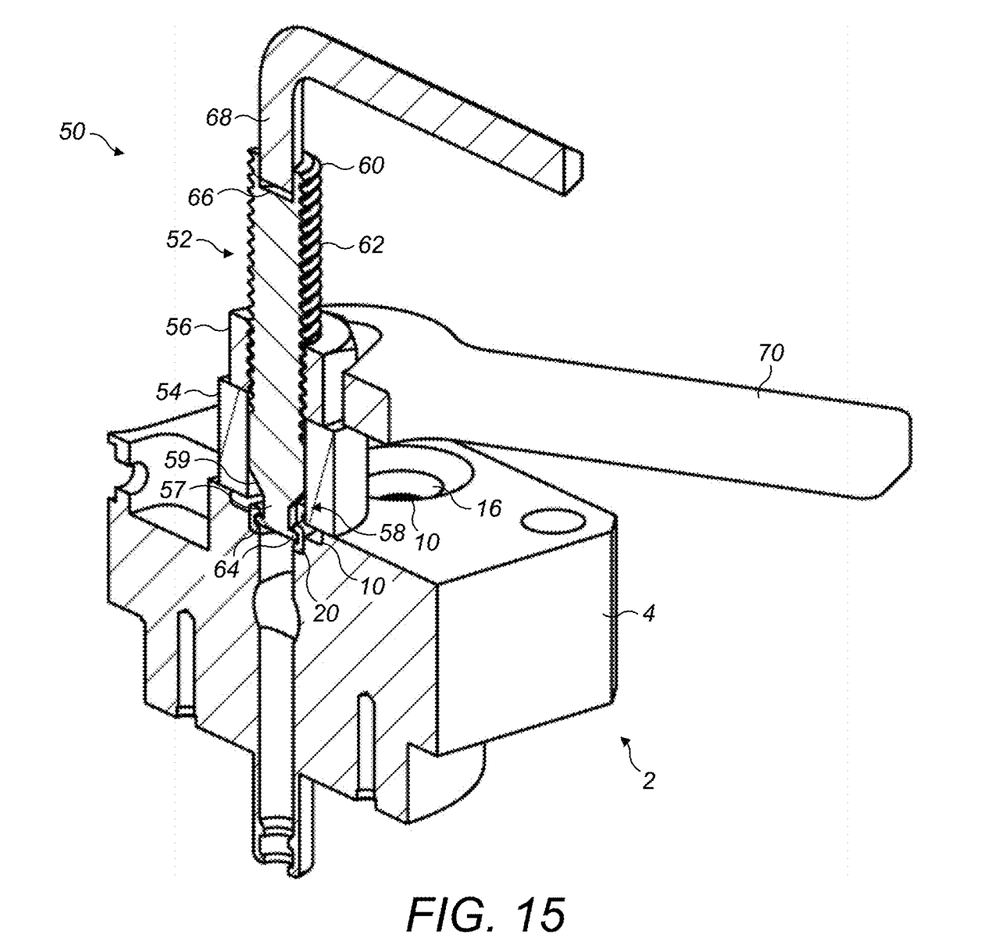
FIG. 15 shows a perspective cross-sectional view of the servovalve, plug and plug removal tool of FIG. 11 in a removal configuration engaged with the plug.
Figure 16:
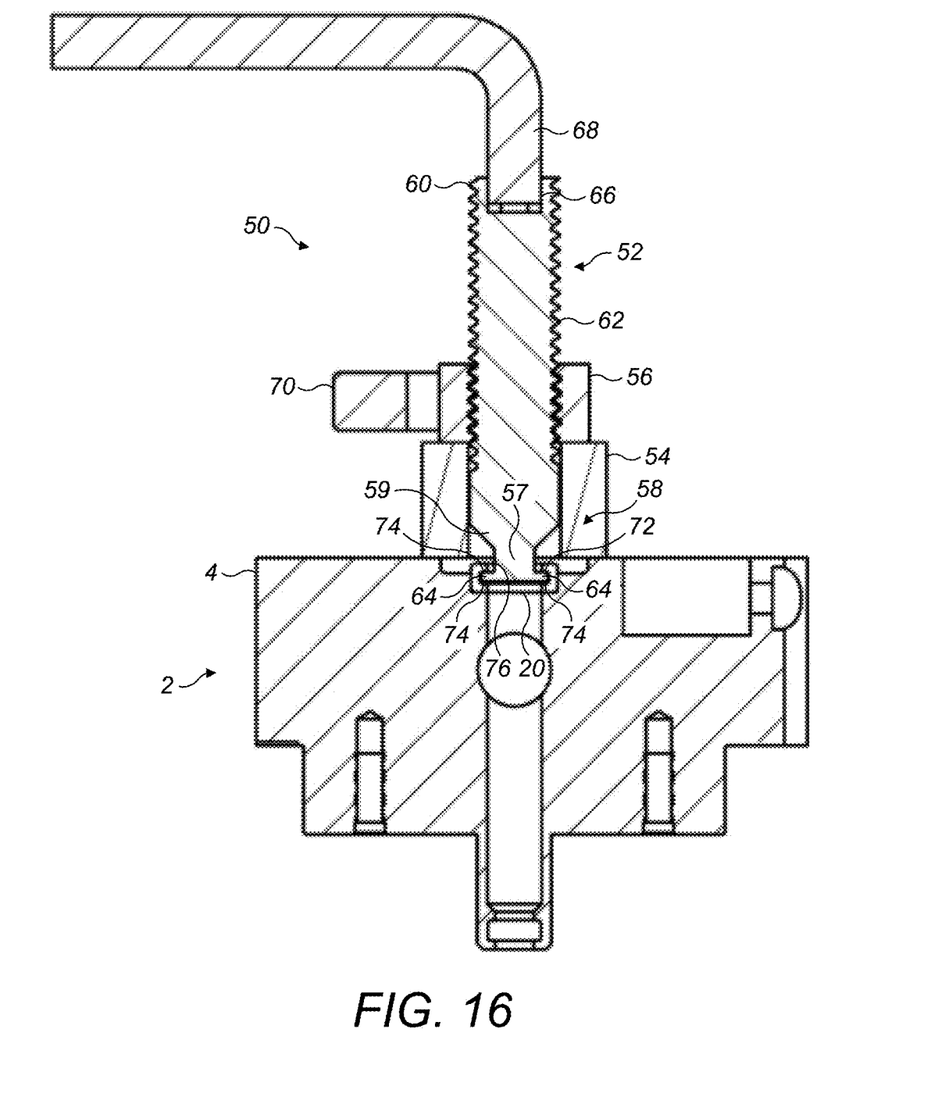
FIG. 16 shows a cross-sectional view of the servovalve, plug and plug removal tool of FIG. 11 in a removal configuration engaged with the plug.

To remove the plug 20, the nut 56 is rotated by the spanner 70 which causes the rod 52 to move upwards (relative to the orientation of the servovalve 2 in FIGS. 14 to 16). Since the lower portion 58 of the rod 52 is locked into recess 36 of the plug body 22, as the rod 52 moves upwards, so does the plug 20. The teeth 64 apply an upward force to the plug body 22 from inside the recess 36 which forces the plug 20 out of the bore 16. Once removed from the bore 16, the plug 20 may be disengaged from the tool 50 by rotating either the rod 52 or the plug body 22 to align the teeth 64 with the slots 25.

The rod 52 may be rotated from the insertion position to the locked position at any point between the insertion of the teeth 64 into the recess 36 and the rotation of the nut 56 to remove the plug 20. For example, the sleeve 54 or the nut 56 may be placed on the rod 52 before the rod is rotated 52 into the locked position.

Once the plug 20 has been removed it may be discarded. The filter 14 may then be removed, for example using a hook-like tool and the relevant port 10 cleaned if necessary. A new filter 14 may then be placed in the bore 16 and a new plug 20 press fitted into the bore 16 to retain the filter 14.

The above described embodiments arrangement offers significant advantages. Firstly, they may allow easy replacement of a filter 14 without the need to return the servovalve 2 to the manufacturer. This is attractive both in terms of time and cost. The tool 50 also allows easy and consistent gripping of a plug 20 to facilitate its removal.

The tool 50 removes the plug 20 by only applying forces in the direction away from the fluid port 10 and parallel to the central axis A of the plug 20 and fluid port 10. This avoids the application of perpendicular forces which may damage parts of the servovalve 2, particularly the bore 16 of the fluid port 10. The tool 50 also avoids damage to the plug 20 to facilitate its easy removal in one piece and thus reduce the possibility of debris falling in the fluid port 10. These parts of the servovalve 2 can be sensitive and so it is important to avoid foreign object damage.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A plug for retaining a filter screen in a fluid port of a servovalve, the plug comprising:
    an annular body, the annular body comprising:
        opposed first and second axial annular end surfaces;
        a radially inner surface extending between the first and second axial annular end surfaces;
        a radially outer surface extending between the first and second axial annular end surfaces;

at least one recess formed in the radially inner surface for receiving a tool for removing the plug from the port, the at least one recess comprising opposed first and second axial recess surfaces;

a plurality of slots formed in the first axial annular end surface and extending between the first axial annular end surface and the first axial recess surface into the at least one recess for providing access for the tool to the at least one recess, wherein each slot comprises two opposing first and second side surfaces joined by a radially outer slot surface, and a fillet where each of the first and second side surfaces join the radially outer slot surface;

a first rounded edge between the first axial annular end surface and the radially inner surface;

a second rounded edge between the first axial recess surface and the radially inner surface;

a third rounded edge between the first axial annular end surface and the first side surface of each slot;

a fourth rounded edge between the first axial annular end surface and the second side surface of each slot;

a fifth rounded edge between the first axial recess surface and the first side surface of each slot a sixth rounded edge between the first axial recess surface and the second side surface of each slot; and a seventh rounded edge between the first axial annular end surface and the radially outer slot surface of each slot.

2. A plug as claimed in claim 1, wherein the slots are evenly annularly distributed around the first axial annular end surface.

3. A plug as claimed in claim 1, wherein the plurality of slots comprises two diametrically opposed slots.

4. A plug as claimed in claim 1, wherein each slot has a radial width ($W_S$) between 40% to 100% of the radial width ($W_R$) of the first axial annular end surface.

5. A plug as claimed in claim 1, wherein each slot has a length ($L_S$) between 30% and 40% of the outer diameter ($D_{PO}$) of the plug body measured between opposing points on the radially outer surface.

6. A servovalve comprising:
a port for receiving an working fluid;
a filter screen mounted in the port; and
a plug as claimed in claim 1 that is interference fitted in the port to retain the filter screen in the port.

7. A plug as claimed in claim 1, wherein the side surfaces of each slot are parallel.

8. A plug as claimed in claim 1, wherein the radially outer slot surface follows a curve of the first axial annular end surface and is parallel with the radially outer surface.

* * * * *